L. Brunier.
Hydraulic Engine.
N° 2,711. Patented Jul. 8, 1842.

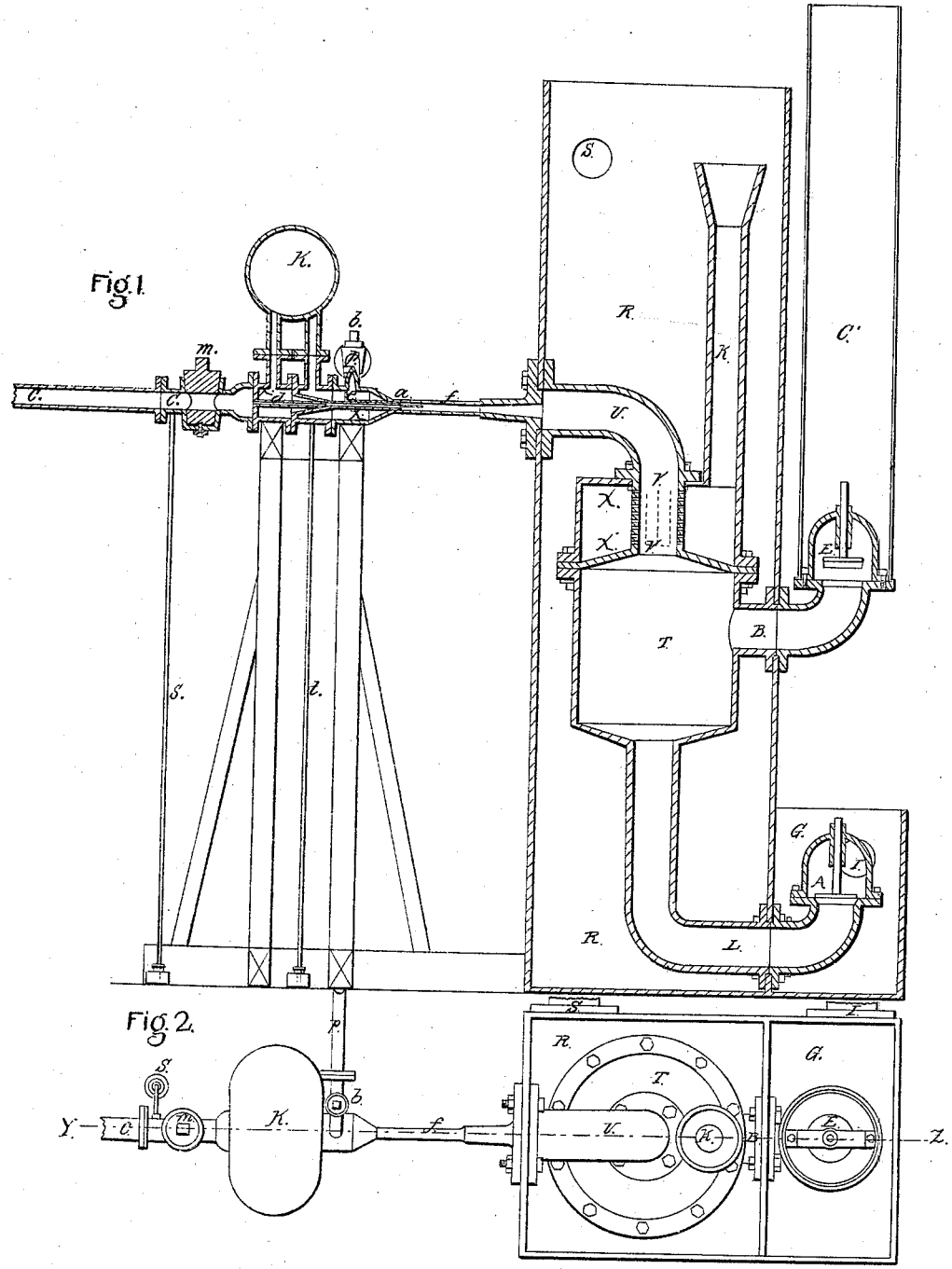

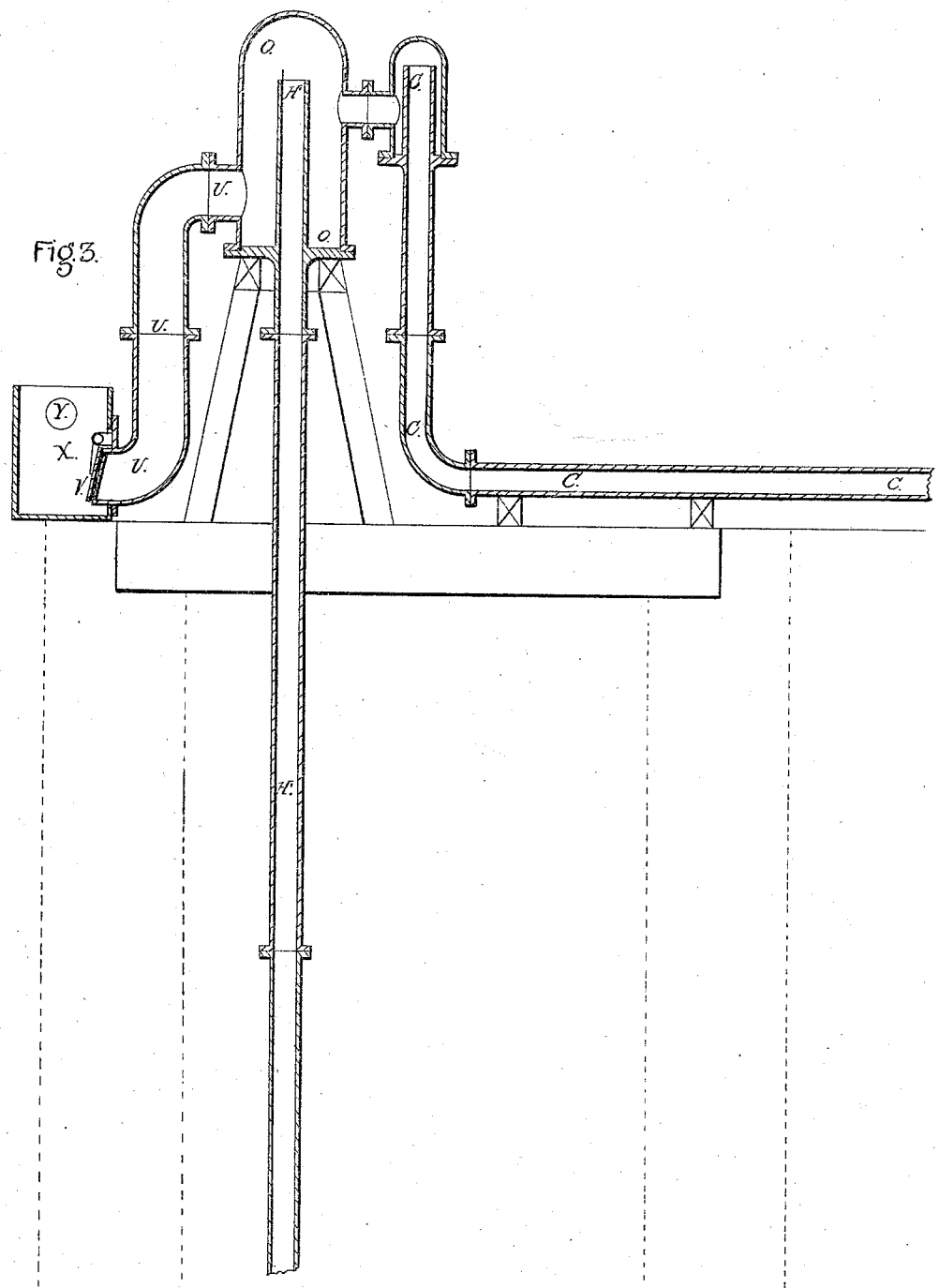

Sheet 3-4 Sheets.

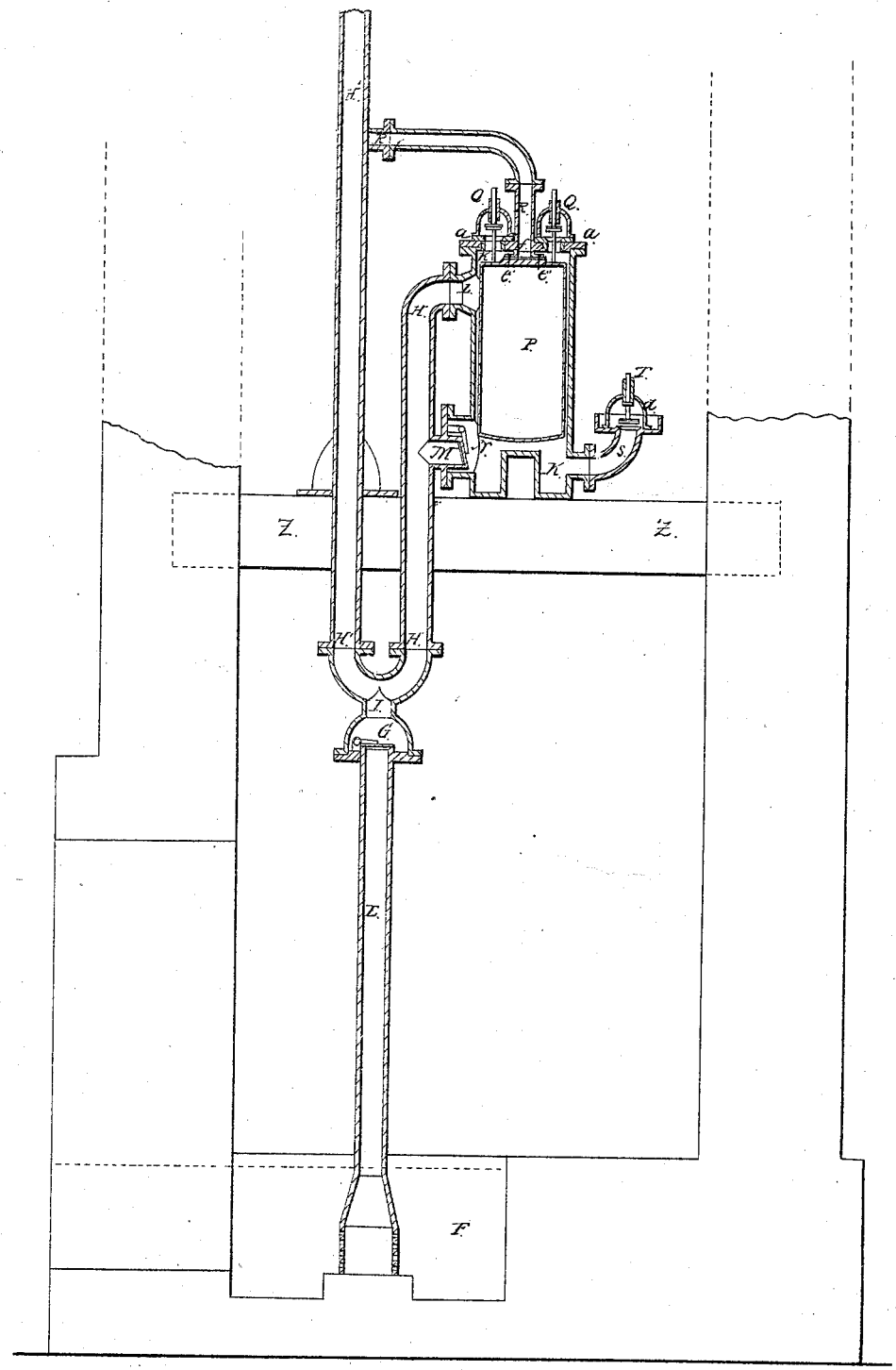

UNITED STATES PATENT OFFICE.

LOUIS BRUNIER, OF FRANCE.

IMPROVEMENT IN HYDRAULIC MACHINES.

Specification forming part of Letters Patent No. 2,711, dated July 8, 1842.

*To all whom it may concern:*

Be it known that I, LOUIS BRUNIER, civil engineer, a citizen of the Kingdom of France, but now residing in the United States, have made a new and useful improvement in or addition to the Apparatus for Raising Water from Wells and other Reservoirs, (for which apparatus Letters Patent of the United States were granted to Pierre Ravard under date of the 17th of December, 1840, and which Letters Patent have been assigned to Eugene Ablon, residing in the city of New York;) and I do hereby declare that the following is a full and exact description of my improvements on or addition to the said machine.

My improved apparatus or machinery is principally intended to take the place of that part of the apparatus described by the above-named Pierre Ravard which is denominated by him the "hydraulic machine," and is, in fact, a new and improved hydraulic machine involving principles of action not used in that of Mr. Ravard, and producing effects not attainable thereby.

By means of my improved hydraulic machine water may be raised in large quantities from mines or other places required to be drained; from rivers or other sources for the supply of cities; from waters which are to be navigated by vessels, so as to be used as a propelling-power to such vessels, which last application thereof I have it in contemplation to secure by Letters Patent when I shall have determined the manner of arranging the machinery for that purpose; and, in fine, I intend to apply my improved apparatus in any situation where it is desired to raise water for any purpose whatever.

Figure 2:
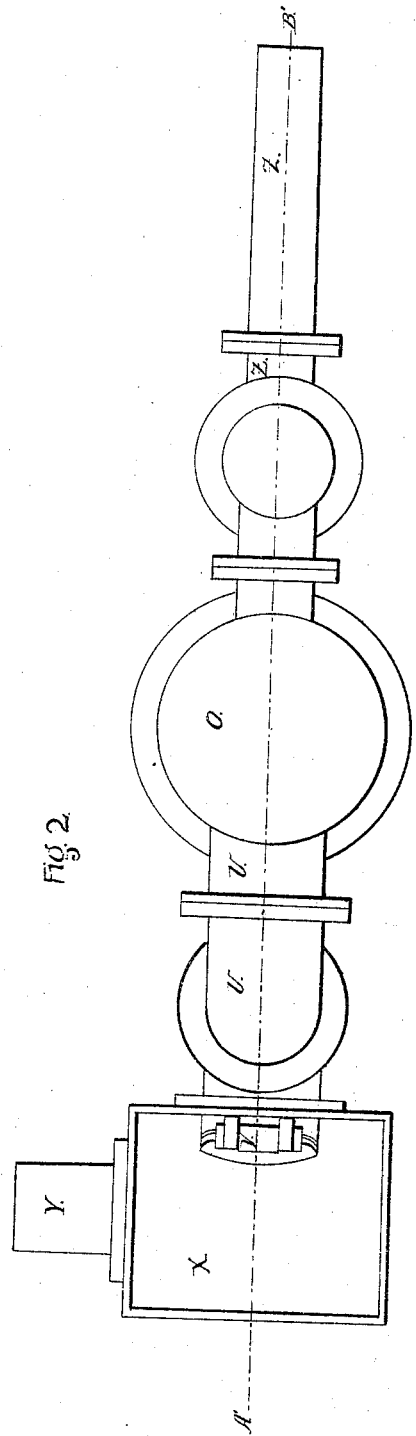
Figure 1:
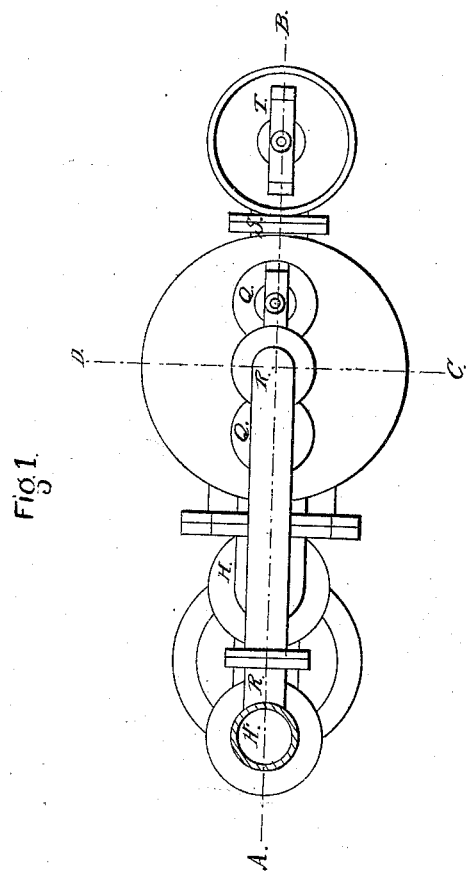

In Sheet A of the accompanying drawings, Figure 1 is a vertical section of a part of the combined apparatus through its center, or in the line Y Z of Fig. 2. This latter figure is a horizontal projection or plan of the same. In each of these figures the portion which is tinted red represents that part of Mr. Ravard's machine which I use, and which is employed for the same purpose to which it was applied by him—namely, to the producing of that partial vacuum that is necessary to the proper action both of his and of my hydraulic machine. This red portion will be found to be the same in all respects with that represented in Figs. 1 and 2 of drawings No. 1, attached to the patent of Mr. Ravard, and which may be substituted by that modification thereof represented in Figs. 1 and 2 of drawing No. 2 in the same instrument. To this part of the apparatus I make no claim as inventor, my right to use the same being derived from the assignee thereof.

In the subjoined description I shall make reference to the said Ravard's apparatus; but for a more full detail of its construction and operation I refer to the specification thereof attached to the Letters Patent granted therefor.

The parts not colored red in Sheet 1 of the accompanying drawings represent the portion of the apparatus added thereto by me, for the purpose of partially condensing the steam which issues from the steam apparatus of Mr. Ravard, and thereby greatly increases its effect. This condensing apparatus I will now proceed to describe.

R R is a reservoir of cold water, to be supplied from any convenient source.

S represents the mouth of a pipe or tube for giving such supply.

T is a condenser surrounded by the cold water in R. Into this condenser a pipe or tube, U, leads from the Ravard apparatus, admitting the mixed air and steam therefrom. The lower part of this tube is surrounded by a water-chest, X X', into which water is admitted from the reservoir R through the pipe K. The lower part of the pipe U—say from V to V—is perforated with a number of small holes, for the admission of water from the water-chest X, which, entering in the form of a spray, is intended to condense the steam and cool the air that was admitted with it into the condenser. This air, condensed steam, and injection-water are discharged in the following manner:

L is a pipe attached to the bottom of the condenser, and recurved so as to have at its outer end a valve, A, opening upward. As the warm water accumulates in the tube L, it will raise this valve, pass into the small reservoir G, and escape through a pipe at I.

For the evacuation of the air and of any uncondensed steam there is a tube, B, leading directly from the side of the condenser, and having a valve, E, opening upward, and this may be surmounted by a flue, C', to conduct off the air and vapor.

The conjoint operation of the Ravard apparatus and of the condenser added by me is as follows: The steam being generated under a pressure of five atmospheres, and the cocks $b$ and $m$ of the Ravard apparatus being closed, if the cock $b$ is opened the steam admitted through the pipe $b$ will flow out through the orifice $a$, and, passing rapidly along the tube $f$, will carry with it the air of the cylinder $xx$ and of the receiver $k$. The mercury in the manometer $t$ will then rise to the height of about nineteen inches, and will stand there. On opening the cock $m$ the air will flow in from the hydraulic machine through the pipe C C, which will exhaust it with great rapidity, the air passing through the tube $d$ into the tube $e$, and thence into $f$, where it commixes with the steam, and escapes with it into the condenser T, is there cooled and condensed, and escapes through the valves A and E, as above described. During this operation the mercury in the manometer $t$ will attain a height of about thirteen inches, when it will become stationary, or nearly so, as the air continually supplied by the hydraulic machine will prevent its elevation.

In the condensing apparatus cold water is to be allowed to flow in continuously through the pipe S into the reservoir R, and a portion of this will overflow the pipe K and fill the water-chest X X'. From this the small streams passing into the condenser through the orifices between V V will cool the air, and condense the greater part, if not the whole, of the steam, producing a partial vacuum in the condenser. The effect of this will be to cause the mercury in the manometer to rise to the height of about twenty-six inches. This augmented rarefaction will cause the influx of air through the tube $d$ from the hydraulic apparatus to be greatly accelerated, and this accumulating in the condenser the pressure therein will soon exceed that of the external air, and the surplus water and air will be discharged through the valves A and E, as above indicated. These alternations of condensation and evacuation take place with great rapidity—say once in every second, or oftener.

The proportions between the various parts of Mr. Ravard's machine as designated by him being preserved, a diameter of about five times that of the tube $f$ should be given to the pipes B and L. The reservoir R may, if requisite, be supplied by a portion of the water raised by the hydraulic machine. The amount of water discharged through the orifices between V V in the pipe U may be varied; but it must be sufficient to effect the condensation of the larger portion of the steam. For an apparatus of the size contemplated less than four hundred gallons in an hour would not answer the intention.

Figure 4:
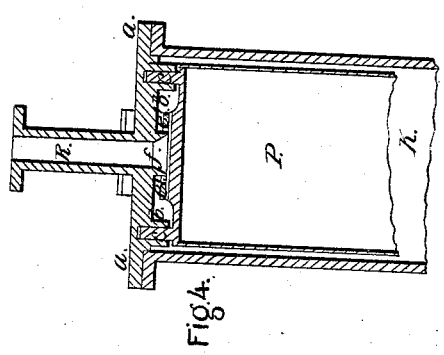

I will now proceed to describe the manner in which I construct my improved hydraulic machine which I have substituted for that used by and described in the specification of Mr. Ravard. This improved machine is represented in Sheet No. 2 of the accompanying drawings. Fig. 1 is a horizontal projection or top view of the lower part of it, looking down upon it from a point just above the pipe R R in Fig. 3. Fig. 2 is a horizontal plan of its upper part. Fig. 3 is a vertical section through the center of the whole machine, or in the lines A B and A' B' of Figs. 1 and 2. Fig. 4 is a vertical section through a portion of the lower part of the machine in the line C D of Fig. 1.

In each of these figures where the same parts occur they are designated by the same letters of reference.

F represents a well or reservoir from which water is to be raised, and E a rising main dipping into said reservoir.

G is a valve on the upper end of the pipe E opening upward.

Above the chamber I, within which the valve G opens, the ascending pipe is divided into two branches, which rise parallel to each other, the main branch H' H' being continued up to the height to which the water is to be raised. The second branch, H H, leads into a cylindrical receiver, K K, with which it communicates by two openings, L and M, the latter being furnished with a valve, N, opening inward. The upper opening, L, is without a valve. The receiver K K is sustained upon a beam, Z Z, and the ascending pipe H' H' is also sustained on the same beam, being provided with an iron plate, $e$, cast upon it and strengthened by a collar or wings attached to it for that purpose.

R R is a pipe leading from the center of the top plate of the reservoir K K into the main ascending pipe H' H', there being a number of small orifices—say of one-fourth of an inch in diameter—bored through the side of the pipe H' opposite the bore of the pipe R.

Through the iron plate $a\ a$, which forms the top of the receiver K K, there are two other openings for the admission of air, and which are closed by two valves opening upward, as shown at Q Q.

Within the receiver K K there is a metallic air-tight vessel, P, which constitutes a float that is to be borne up by the water which is to enter the receiver, and is by its upward pressure to open the valves Q Q and close the opening $f$, leading into the tube R, in a manner and for a purpose to be presently explained. To enable the float to close the opening $f$, leading into the pipe R, it is provided with a piece of leather confined in place on its upper side by a ring or otherwise and fitting against said opening. The float is guided in its ascent and descent by two small rods, $c\ c$, Fig. 4, which slide in cylindrical openings $b\ b$, attached to the iron plate $a\ a$.

S is a discharge-pipe leading from the lower end of the receiver K, and surmounted by a valve, T, opening upward, and having on its stem a regulating-nut, $d$, by which its play may be governed. The main ascending pipe H' H' terminates in a receiver, O O, at the upper part of the structure, and from this proceeds the discharge-pipe U U, the lower end of which is furnished with a valve, V, opening outward and admitting the water to flow into the receiver X, from which it is conducted off by a pipe, Y. The pipe or tube C C is the same with that so marked on Sheet No. 1, being that by which the air exhausted from the hydraulic apparatus by the action of the steam in the pneumatic apparatus is conducted thereto, as herein described.

The following is the manner in which the hydraulic machine operates: The air being sufficiently exhausted by the continuous action of the pneumatic apparatus, which will be indicated by the mercury in the manometer $s$, drawing No. 1, rising to the height of about thirteen inches, the valve G will then be made to rise by the pressure of the column of water forced up by the atmospheric pressure from the well F, and said water will pass up simultaneously into the pipes H' and H. When, in passing the latter, it has reached the tubulure or opening M, it will open the valve N and pass into the receiver K K. Within this receiver, and also in the pipes H and H', it will continue to rise, keeping on the same level in each, until it arrives at the opening L, at which time the float P will, from its buoyancy, be borne up against the lower stems of the air-valves Q Q, which valves it will consequently raise, and at the same time stop the orifice $f$ of the pipe R R, through which the air until then had been exhausted from the receiver K. The raising of the valves Q Q allows the air of the atmosphere to enter the receiver and to press upon the surface of the water in the pipe H, which it will force into the pipe H', constituting, with that which had previously entered said pipe, a column of about thirteen feet in height. From the rarefaction of the air in the receiver O, and the pressure of the atmospheric air upon this column as it descends in the pipe H, it will be caused to ascend in the pipe H' with a velocity of about forty feet per second, by which it will be kept in an unbroken column, the air at this velocity not having the power to penetrate it. The column of water having been discharged into the receiver O will be followed by the column of air which had served to elevate it, and this air will then be exhausted from said receiver through the pipes C C by the continuous action of the pneumatic apparatus. While the column of water is ascending in the pipe H', the water in the reservoir K will be in part discharged through the valve T, and the float P will consequently descend, the air-valves Q Q will be closed, and the apparatus prepared for a fresh ascension of a column of water. The nut on the stem of the valve T admits of its being so regulated as that its action shall correspond with the motion of the rising column of water, allowing the valves Q Q to close at the instant, or nearly so, that the water has entirely entered the receiver O.

The apparatus may be varied in size, and the relative proportions of its essential parts may in all cases be determined in the following manner: The height to which the water is to be raised and its volume being known, the diameter of the pipes H H and H' H' may be readily ascertained. For an elevation of one hundred and fifty feet the action of the machine in raising a column of water must be repeated ten times in a minute, and a corresponding increase or decrease in the number of actions in a given time is to be observed in any variation of this height. By dividing the whole volume of water to be raised in one minute by the number of actions of the machine in the same time the quotient will give the volume to be raised in each repetition of this action. The diameter of a cylinder the height of which is thirteen feet and the solid contents of which shall be equal to the volume of water to be raised in each ascension will be the diameters which must be given to the interior of the pipes H and H'. The diameter of the air-valves Q Q should be about three-fourths that of the pipes H H'. The float P should have a diameter about three and a half times that of the pipes H H', and its height should be about double its diameter. The diameter of the tube $f$ of the pneumatic apparatus should be about one-third of that of the pipes H H'.

I am aware that air has been admitted into the ascending pipes of pumps, and has been allowed to commingle with the water contained therein, whereby the column has been rendered of less specific gravity, and could, therefore, be raised to a greater height by atmospheric pressure than in the ordinary lifting-pump; but this device has not been applied to any useful purpose, nor does it appear to be capable of such application. It differs also materially from my mode of forcing up a column of water by atmospheric pressure, as in my apparatus it is forced up in an unbroken column, in consequence of its having acquired a momentum in its descent in the pipe H which effectually prevents the passing of the air into the column or body of the water as it ascends in the pipe H'.

Having thus fully described the nature of my improvements in the apparatus invented by Mr. Ravard for raising water, and shown the operations of the respective parts thereof, what I claim therein as new, and desire to secure by Letters Patent, is—

1. The combining of the condensing apparatus, substantially as herein described, with the pneumatic apparatus as used by Mr. Ravard, said condensing apparatus consisting of the reservoir R R, the condenser T, the tube U, surrounded by the water-chest X X', the exhaust-valves A and E, and their respective appendages or other devices equivalent thereto and producing the same results by means substantially the same.

2. In the hydraulic apparatus, the manner of combining and arranging the two pipes H and H' with each other and with the receiver K K, and also of arranging the respective valves and pipes connected with said receiver, so as to be operated upon by the float P, and of combining the whole together in such manner as that the external air shall be admitted to press upon the column of water to be raised, and effect its ascension, in the manner herein fully made known.

L. BRUNIER.

Witnesses:
 THOS. P. JONES,
 E. ABLON.